US012449794B2

(12) United States Patent
Sato (10) Patent No.: US 12,449,794 B2
(45) Date of Patent: Oct. 21, 2025

(54) PRODUCTION SYSTEM (71) Applicant: CHIYODA CORPORATION, Yokohama (JP)

(72) Inventor: Hideki Sato, Yokohama (JP)

(73) Assignee: CHIYODA CORPORATION, Kanagawa (JP)

(*) Notice: Subject to any disclaimer, the term of this patent is extended or adjusted under 35 U.S.C. 154(b) by 0 days.

(21) Appl. No.: 18/997,888

(22) PCT Filed: Aug. 5, 2022

(86) PCT No.: PCT/JP2022/030089
§ 371 (c)(1),
(2) Date: Jan. 23, 2025

(87) PCT Pub. No.: WO2024/029069
PCT Pub. Date: Feb. 8, 2024

(65) Prior Publication Data
US 2025/0264871 A1    Aug. 21, 2025

(51) Int. Cl.
*G05B 19/418* (2006.01)
(52) U.S. Cl.
CPC ........... *G05B 19/41885* (2013.01); *G05B 2219/32359* (2013.01)
(58) Field of Classification Search
CPC ........... G05B 19/41885; G05B 2219/32359
(Continued)

(56) References Cited

U.S. PATENT DOCUMENTS 6,947,917 B1    9/2005  Mathur et al.
2002/0156542 A1  10/2002  Nandi
(Continued)

FOREIGN PATENT DOCUMENTS

CN    107735735 A      2/2018
CN    111275260 A  *   6/2020  ............. G06Q 50/04
(Continued)

OTHER PUBLICATIONS

International Search Report issued on Oct. 11, 2022, in corresponding International Application No. PCT/JP2022/030089; 4 pages.
(Continued)

*Primary Examiner* — Thomas C Lee
*Assistant Examiner* — Michael Tang
(74) *Attorney, Agent, or Firm* — Maier & Maier, PLLC (57) ABSTRACT

A production system includes a first device, a second device, a first sensor, a second sensor and a control device. The control device controls the first device based on a first condition list including a plurality of control parameters of the first device, and controls the second device based on a second condition list including a plurality of control parameters of the second device. The control device acquires a first processed product information, acquires a modified value of the second condition list based on a second model that outputs a modified value of the second condition list in response to the first processed product information, acquires the second condition list modified based on the second condition list and the modified value of the second condition list, and controls the second device based on the modified second condition list.

10 Claims, 4 Drawing Sheets (58) Field of Classification Search
USPC .......................................................... 700/97
See application file for complete search history.

(56) References Cited

U.S. PATENT DOCUMENTS

| | | | |
|---|---|---|---|
| 2018/0046158 | A1 | 2/2018 | Saito et al. |
| 2019/0187631 | A1* | 6/2019 | Badgwell ............... G06N 3/006 |
| 2019/0324432 | A1 | 10/2019 | Cella et al. |
| 2022/0066399 | A1 | 3/2022 | Hasegawa |
| 2022/0082949 | A1 | 3/2022 | Hubaux et al. |
| 2022/0143569 | A1* | 5/2022 | Holzmeister ...... G05B 13/0265 |
| 2022/0205661 | A1 | 6/2022 | Fujita et al. |
| 2023/0333482 | A1 | 10/2023 | Hubaux et al. |
| 2024/0004355 | A1* | 1/2024 | Zhao .................... G05B 13/048 |

FOREIGN PATENT DOCUMENTS

| | | | | |
|---|---|---|---|---|
| CN | 112908424 | A * | 6/2021 | ............. C10G 11/00 |
| JP | S48000274 | A | 1/1973 | |
| JP | 2003531440 | A | 10/2003 | |
| JP | 2010049542 | A * | 3/2010 | |
| JP | 2019123678 | A * | 7/2019 | |
| JP | 2020530159 | A | 10/2020 | |
| JP | 2022520643 | A | 3/2022 | |
| TW | 202032257 | A | 9/2020 | |
| TW | 202223561 | A * | 6/2022 | ....... G05B 19/41875 |

OTHER PUBLICATIONS

Office Action issued on May 16, 2023, in corresponding Japanese Application No. 2023-512711; 8 pages.
Office Action issued on Oct. 1, 2024, in corresponding Tiwanese Application No. 112126693; 11 pages.
Decision to Grant a Patent issued on Oct. 3, 2023, in corresponding Japanese Application No. 2023-512711; 5 pages.
Extended Search Report issued on Jul. 29, 2025, in corresponding European Application No. 22954057.0, 10 pages.

* cited by examiner

PRODUCTION SYSTEM

TECHNICAL FIELD

The present invention relates to a production system.

BACKGROUND ART

Patent Literature 1 discloses a batch processing type production system that controls a device based on a condition list including a plurality of control parameters and performs a predetermined processing. A control device of the production system generates the condition list by modifying a preset reference condition list in response to a user request. The user request includes, for example, an increase or decrease in production volume and a change in product quality level, etc. The control device uses a machine learning model to generate a modified condition list that corresponds to the user request.

CITATION LIST

Patent Literature

[Patent Literature 1] JP-A-2003-531440

SUMMARY OF INVENTION

Technical Problem

Some production systems include a plurality of continuous processes. In such production systems, a decline in a capacity of a device performing an upstream process causes fluctuations in a state of an intermediate product input to a downstream process. The decline in a capacity of the device occurs, for example, due to a catalyst deterioration or a fouling. As a result, it becomes difficult to control a state of a yield, quality, etc. of a final product.

In view of the above background, the present invention has an object to control a state of a final product in a production system including a plurality of continuous processes.

Solution to Problem

In order to solve the above problems, one aspect of the present invention is a production system (1) that performs a first process and a second process continuously, comprising: a first device (2); a second device (3); at least one first sensor (21); at least one second sensor (23); and a control device (30), wherein the first device performs the first process to obtain a first processed product from a raw material, the second device performs the second process to obtain a second processed product from the first processed product, the first sensor detects a first device information that is a state of the first device, the second sensor detects a second device information that is a state of the second device, the control device controls the first device based on a first condition list including a plurality of control parameters of the first device, and controls the second device based on a second condition list including a plurality of control parameters of the second device, the control device acquires a first processed product information based on a first model that outputs the first processed product information related to a property of the first processed product in response to an input including a raw material information related to a property of the raw material and the first device information, the control device acquires a modified value of the second condition list based on a second model that outputs a modified value of the second condition list in response to an input including the first processed product information, the control device acquires the second condition list modified based on the second condition list and the modified value of the second condition list, and the control device controls the second device based on the modified second condition list.

According to this aspect, the property of the first processed product supplied to the second process are estimated, and the second condition list is modified based on the property of the first processed product. This makes it possible to control a state of the second processed product. In other words, in a production system including a plurality of continuous processes, it is possible to control a state of a final product.

In the above aspect, the control device may acquire an estimated first device information based on a third model that outputs the estimated first device information, which is information regarding a state of the first device and is not detected by the first sensor, in response to an input including the raw material information, the first device information, and the first processed product information, may acquire a modified value of the first condition list based on a fourth model that outputs a modified value of the first condition list in response to an input including at least one of the estimated first device information and the first processed product information, may acquire the first condition list modified based on the first condition list and the modified value of the first condition list, and may control the first device based on the modified first condition list.

According to this aspect, the first condition list is modified based on the estimated first device information, whereby the state of the first process product supplied to the second process can be controlled.

In the above aspect, the first process may be a chemical reaction, the raw material information may include at least one of a composition of the raw material, a density of the raw material, and a molecular weight of the raw material, the first device information may include at least one of an inlet temperature of the first device, an outlet temperature of the first device, an internal temperature of the first device, an internal pressure of the first device, and a flow rate of the raw material in the first device, the first processed product information may include at least a yield of the first processed product, the estimated first device information may include at least one of an activity of a catalyst provided inside the first device, a heat exchange efficiency of the first device, and a flow state of the raw material in the first device, the first condition list may include at least one of an internal temperature of the first device, an internal pressure of the first device, and a flow rate of the raw material in the first device, and the second condition list may include at least one of an internal temperature of the second device, an internal pressure of the second device, and a flow rate of the first processed product in the second device.

According to this aspect, it is possible to control the state of the first processed product obtained by the first process, which is a chemical reaction, and the state of the second processed product obtained by the second process.

In the above aspect, the first process may be a separation, the raw material information may include at least one of a composition of the raw material, a density of the raw material, and a molecular weight of the raw material, the first device information may include at least one of an inlet temperature of the first device, an outlet temperature of the first device, an internal temperature of the first device, an internal pressure of the first device, and a flow rate of the raw material in the first device, the first processed product information may include at least a yield of the first processed product, the estimated first device information may include at least one of a heat exchange efficiency of the first device and a flow state of the raw material in the first device, the first condition list may include at least one of an internal temperature of the first device, an internal pressure of the first device, and a flow rate of the raw material in the first device, and the second condition list may include at least one of an internal temperature of the second device, an internal pressure of the second device, and a flow rate of the first processed product in the second device.

According to this aspect, it is possible to control the state of the first processed product obtained by the first process, which is a separation, and the state of the second processed product obtained by the second process.

In the above aspect, the first process may be drying, the raw material information may include at least one of a composition of the raw material, a density of the raw material, and a molecular weight of the raw material, the first device information may include at least one of an internal temperature of the first device, an internal pressure of the first device, and a heating rate of the first device, the first processed product information may include at least a yield of the first processed product, the first condition list may include at least one of an internal temperature of the first device, an internal pressure of the first device, and a heating rate of the first device, and the second condition list may include at least one of an internal temperature of the second device, an internal pressure of the second device, and a flow rate of the first processed product in the second device.

According to this aspect, it is possible to control the state of the first processed product obtained by the first process, which is drying, and the state of the second processed product obtained by the second process.

In the above aspect, the first process and the second process may be batch processes.

In the above aspect, the first model and the second model may include at least one of a machine learning model and a mathematical model.

In the above aspect, the control device may acquire a modified value of the second condition list based on the first processed product information and the second model when a difference between a value included in the first processed product information and a target value is equal to or greater than a threshold value.

In the above aspect, the control device includes a storage unit (30B) that stores the modified first condition list and the modified second condition list.

According to the above aspect, it is possible to control the state of a final product in a production system including a plurality of continuous processes.

DESCRIPTION OF EMBODIMENTS

Hereinafter, an embodiment of a production system according to the present invention will be described.

Figure 1:
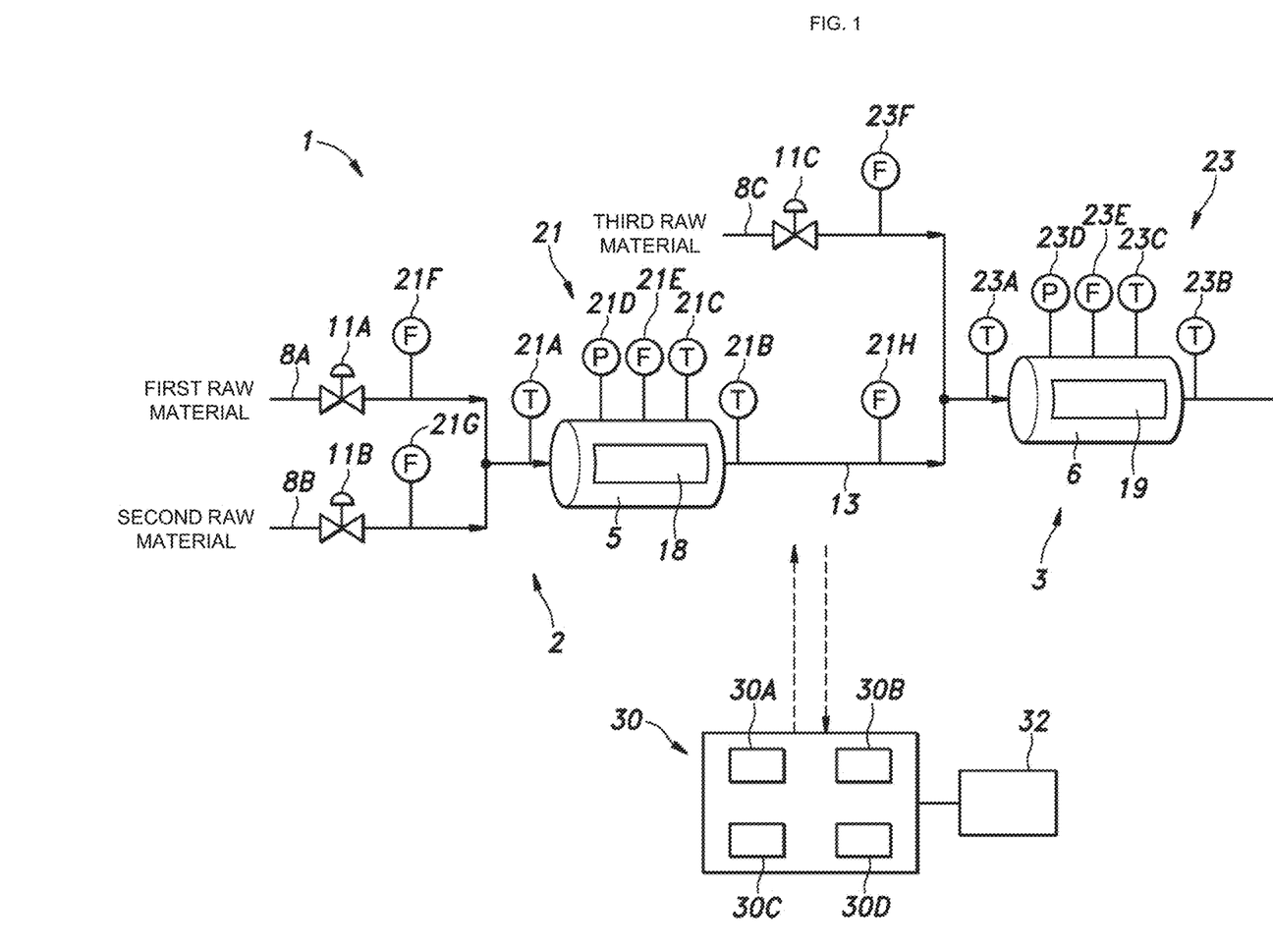
FIG. 1 is a diagram showing a configuration of a production system.

A production system 1 performs a first process and a second process continuously. The production system 1 includes a first device 2 that performs a first process to obtain a first processed product from a raw material, and a second device 3 that performs a second process to obtain a second processed product from the first processed product.

The first process and the second process are batch processes. In another embodiment, the first process and the second process may be continuous processes. Each of the first process and the second process may be any one of a chemical reaction, a separation, and a drying. The separation may be any one of an extraction, a crystallization, a distillation, a centrifugation, a membrane separation, an adsorption separation, and an equilibrium separation.

The first device 2 includes a first device body 5 that performs the first process. The first device body 5 may be a reactor for performing a chemical reaction, a separator for performing a separation, or a dryer for performing a drying. The second device 3 includes a second device body 6 that performs the second process. The second device body 6 may be a reactor, a separator, or a dryer, similar to the first device body 5.

The reactor may be a batch reactor or a continuous reactor. The reactor may be a well-known reactor such as a tank reactor, a tubular reactor, or a continuous tank reactor. A catalyst may be provided inside the reactor.

The separator may be an extraction device, a crystallization device, a distillation device, a centrifuge, a membrane separation device, an adsorption separator, or an equilibrium separator. The extraction device may be a well-known extraction device such as a Soxhlet extractor or a Kuni extractor. The crystallization device may be a well-known crystallization device such as a Crystal Oslo crystallizer or an inverted cone crystallizer. The distillation device may be a well-known distillation device such as a pot still or a continuous still.

The first device 2 includes at least one raw material supply pipe 8A, 8B connected to an inlet of the first device body 5. In this embodiment, the raw material supply pipes 8A, 8B include a first raw material supply pipe 8A for supplying a first raw material to the first device body 5 and a second raw material supply pipe 8B for supplying a second raw material to the first device body 5. A first flow control valve 11A is provided in the first raw material supply pipe 8A. The first flow control valve 11A controls a flow rate of the first raw material flowing through the first raw material supply pipe 8A. A second flow control valve 11B is provided in the second raw material supply pipe 8B. The second flow control valve 11B controls a flow rate of the second raw material flowing through the second raw material supply pipe 8B.

The first device 2 includes a connecting pipe 13 that connects an outlet of the first device body 5 and the inlet of the second device 3. The connecting pipe 13 supplies a first processed product produced in the first device body 5 to the second device body 6.

The second device 3 may include at least one third raw material supply pipe 8C connected to the inlet of the second device 3. In this embodiment, there is one third raw material supply pipe 8C, which supplies a third raw material to the second device body 6. The third raw material supply pipe 8C may be omitted. For example, when the second device body 6 is a distillation device, the third raw material supply pipe 8C may be omitted. A third flow control valve 11C is provided in the third raw material supply pipe 8C. The third flow control valve 11C controls a flow rate of the third raw material flowing through the third raw material supply pipe 8C.

The second device 3 includes an outlet pipe 15 connected to the outlet of the second device body 6.

The first device 2 includes a first temperature regulator 18 for adjusting a temperature of the first device body 5. The second device 3 includes a second temperature regulator 19 for adjusting a temperature of the second device body 6. The first temperature regulator 18 and the second temperature regulator 19 include at least one of a heater, a cooler, and a heat exchanger. The heater may perform a heating using an electricity or a heat from combustion of a fuel, for example. The heat exchanger may include a jacket where a heat medium flows, and a control valve that controls a flow rate of the heat medium.

At least one first sensor 21 is provided in the first device 2 to detect a first device information, which is a state of the first device 2. The first device information includes at least one of the inlet temperature of the first device body 5, the outlet temperature of the first device body 5, the internal temperature of the first device body 5, the internal pressure of the first device body 5, and the flow rate of the raw material in the first device body 5. The first device information may also include the flow rate of each raw material supplied to the first device body 5 and the flow rate of the first processed product discharged from the first device body 5. The first sensor 21 may include a first inlet temperature sensor 21A that measures the inlet temperature of the first device body 5, a first outlet temperature sensor 21B that measures the outlet temperature of the first device body 5, a first internal temperature sensor 21C that measures the internal temperature of the first device body 5, a first pressure sensor 21D that measures the internal pressure of the first device body 5, and a first device body flow rate sensor 21E that measures the flow rate of the raw material in the first device body 5. In addition, the first sensor 21 may include a first raw material flow rate sensor 21F provided in the first raw material supply pipe 8A, a second raw material flow rate sensor 21G provided in the second raw material supply pipe 8B, and a first processed product flow rate sensor 21H provided in the connecting pipe 13.

At least one second sensor 23 is provided in the second device 3 to detect a second device information, which is a state of the second device 3. The second device information includes at least one of the inlet temperature of the second device body 6, the outlet temperature of the second device body 6, the internal temperature of the second device body 6, the internal pressure of the second device body 6, and the flow rate of the raw material in the second device body 6. The second sensor 23 may include a second inlet temperature sensor 23A that measures the inlet temperature of the second device body 6, a second outlet temperature sensor 23B that measures the outlet temperature of the second device body 6, a second internal temperature sensor 23C that measures the internal temperature of the second device body 6, a second pressure sensor 23D that measures the internal pressure of the second device body 6, and a second device body flow rate sensor 23E that measures the flow rate of the raw material in the second device body 6. The second sensor 23 may also include a third raw material flow rate sensor 23F provided in the third raw material supply pipe 8C and a second processed material flow rate sensor 23G provided in the outlet pipe 15.

The production system 1 includes a control device 30 that controls the first device 2 and the second device 3. The control device 30 is a calculation device including an MPU (microprocessor) 30A, a storage unit 30B including a non-volatile memory, a volatile memory 30C, and an interface 30D. The control device 30 realizes various applications by performing programs stored in the storage unit 30B by the microprocessor. The control device 30 controls the first device 2 based on a first condition list including a plurality of control parameters of the first device 2. The control device 30 also controls the second device 3 based on a second condition list including a plurality of control parameters of the second device 3. The first condition list and the second condition list are stored in the storage unit 30B of the control device 30. The modified first condition list and the modified second condition list described later are also stored in the storage unit 30B of the control device 30.

The control device 30 is connected to the plurality of first sensors 21, the plurality of second sensors 23, the first to third flow control valves 11A to 11C, the first temperature regulator 18, and the second temperature regulator 19. The control device 30 is also connected to an input device 32 that is operated by an operator. The control device 30 receives signals from the plurality of first sensors 21, the plurality of second sensors 23, and the input device 32. The control device 30 also controls the first to third flow control valves 11A to 11C, the first temperature regulator 18, and the second temperature regulator 19.

The control device 30 controls the first device 2 based on the first condition list including the plurality of control parameters of the first device 2, and controls the second device 3 based on the second condition list including the plurality of control parameters of the second device 3. The control parameters included in the first condition list may include an opening of the first flow control valve 11A, an opening of the second flow control valve 11B, and a control amount of the first temperature regulator 18. When the first temperature regulator 18 is an electric heater, the control amount may be, for example, the supplied power. When the first temperature regulator 18 is a heat exchanger, the control amount may be, for example, an opening of a control valve that controls the flow rate of the heat medium.

The control parameters included in the first condition list may include, for example, a target flow rate of the first raw material flowing through the first raw material supply pipe 8A, a target flow rate of the second raw material flowing through the second raw material supply pipe 8B, a target flow rate of the first processed product flowing through the connecting pipe 13, a target inlet temperature of the first device body 5, a target internal temperature of the first device body 5, and a target outlet temperature of the first device body 5. The control device 30 may set an opening of the first flow control valve 11A based on the flow rate of the first raw material detected by the first raw material flow rate sensor 21F and the target flow rate of the first raw material. The control device 30 may set an opening of the second flow control valve 11B based on the flow rate of the second raw material detected by the second raw material flow rate sensor 21G and the target flow rate of the second raw material. The control device 30 may set an opening of the third control valve based on the flow rate of the first processed product detected by the first processed product flow rate sensor 21H and the target flow rate of the first processed product. The control device 30 may set the control amount of the first temperature regulator 18 based on the inlet temperature of the first device body 5 detected by the first inlet temperature sensor 21A, the internal temperature of the first device body 5 detected by the first internal temperature sensor 21C, the outlet temperature of the first device body 5 detected by the first outlet temperature sensor 21B, the target inlet temperature of the first device body 5, the target internal temperature of the first device body 5, and the target outlet temperature of the first device body 5.

The control parameters included in the second condition list are the opening of the third flow control valve 11C and the control amount of the second temperature regulator 19. When the second temperature regulator 19 is an electric heater, the control amount may be, for example, the supplied power. Also, when the second temperature regulator 19 is a heat exchanger, the control amount may be, for example, an opening of a control valve that controls the flow rate of the heat medium.

The control parameters included in the second condition list may include, for example, the target flow rate of the first processed product flowing through the connecting pipe 13, the target flow rate of the third raw material flowing through the third raw material supply pipe 8C, the target flow rate of the second processed product flowing through the outlet pipe 15, the target inlet temperature of the second device body 6, the target internal temperature of the second device body 6, and the target outlet temperature of the second device body 6. The control device 30 may set an opening of the third flow control valve 11C based on the flow rate of the third raw material detected by the third raw material flow rate sensor 23F and the target flow rate of the third raw material. The control device 30 may set the control amount of the second temperature regulator 19 based on the inlet temperature of the second device body 6 detected by the second inlet temperature sensor 23A, the internal temperature of the second device body 6 detected by the second internal temperature sensor 23C, the outlet temperature of the second device body 6 detected by the second outlet temperature sensor 23B, the target inlet temperature of the second device body 6, the target internal temperature of the second device body 6, and the target outlet temperature of the second device body 6.

The first condition list and the second condition list may exist or may be newly created for the production system 1. The first condition list and the second condition list are set so as to achieve consistency in material balance. Specifically, when the yield of the processed product (second processed product) of the second process is 400 g/min, the flow rate of one of the raw materials of the second process (first processed product) is required to be 300 g/min. Therefore, the first condition list of the first process that produces one of the raw materials of the second process (first processed product) is adjusted so as to produce 300 g/min of the first processed product. In other words, the mass of the first processed product supplied from the first process and the mass of the first processed product supplied to the second process are set to be the same.

Furthermore, the first condition list and the second condition list are set to ensure consistency in process conditions (temperature, pressure, flow rate, etc.). For example, the target outlet temperature of the first device body 5 included in the first condition list and the target inlet temperature of the second device body 6 included in the second condition list are set to match.

Figure 2:
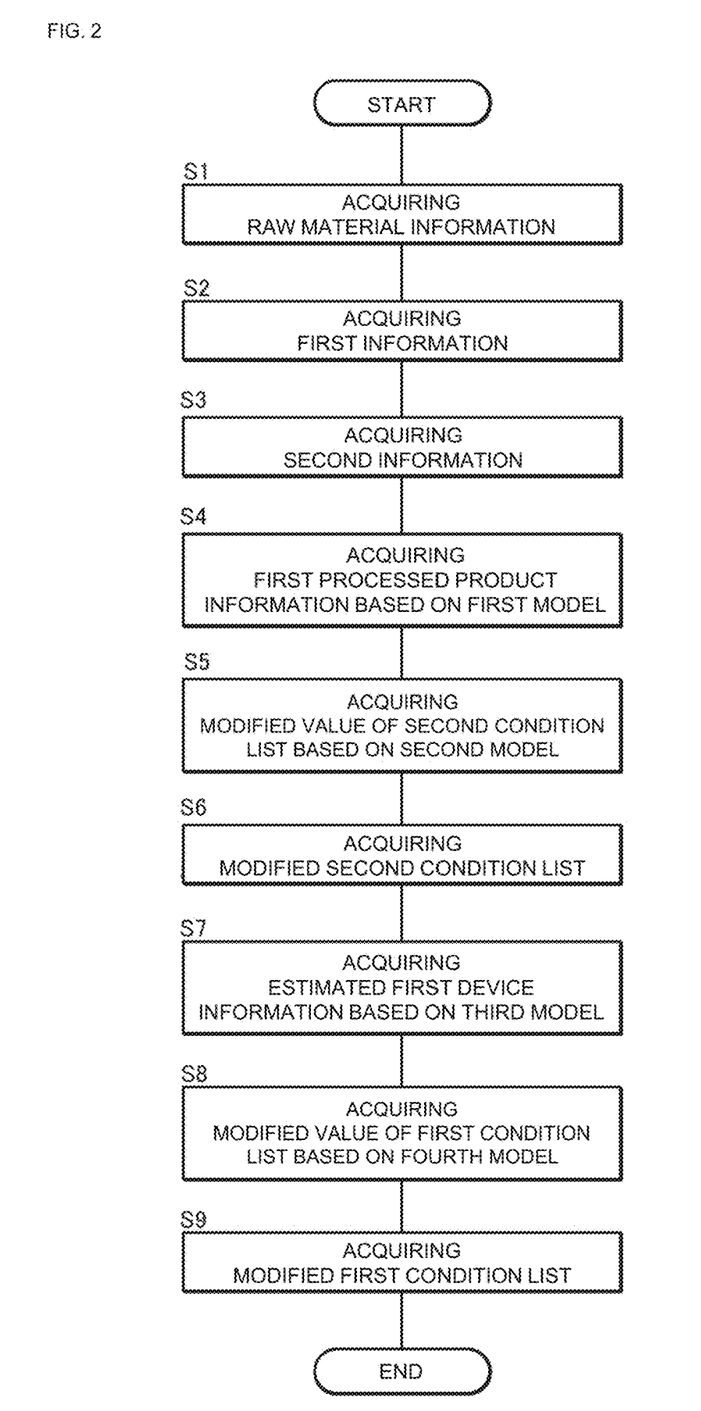
FIG. 2 is a diagram showing a flow of a condition list modification processing.

While controlling the first device 2 and the second device 3, the control device 30 performs a process of modifying the condition list shown in FIG. 2 at predetermined time intervals to modify the first condition list and the second condition list. The control device 30 then controls the first device 2 based on the modified first condition list, and controls the second device 3 based on the modified second condition list.

As shown in FIG. 2, in the process of modifying the condition list, the control device 30 first acquires the raw material information related to the property of the raw material (S1). The operator inputs the raw material information using the input device 32, and the control device 30 stores the input raw material information. The control device 30 may generate the raw material information by prediction processing based on the process analysis technology and store it as the raw material information. In this embodiment, the raw material information may include information related to the first raw material, the second raw material, and the third raw material. The raw material information may include at least one of the composition of each raw material, the density of each raw material, and the molecular weight of each raw material.

Next, the control device 30 acquires the first device information based on a signal from the first sensor 21 (S2). Then, the control device 30 acquires the second device information based on a signal from the second sensor 23 (S3).

Next, the control device 30 acquires the first processed product information based on a first model that outputs the first processed product information related to the property of the first processed product in response to an input including the raw material information and the first device information (S4). The first processed product information includes at least the yield of the first processed product. The first processed product information may also include at least one of the crystal size of the first processed product and the crystal form of the first processed product. The first processed product information may also include at least one of the density of the first processed product and the specific heat of the first processed product.

The first model is a model that specifies the relationship between an input including the raw material information and the first device information, and an output including the first processed product information. The first model includes at least one of a machine learning model and a mathematical model. The first model may be, for example, a machine learning model created by a machine learning using the raw material information, the first device information, and the first processed product information as a training data. The first processed product information may be acquired by the actual measurement or the simulation to create the training data. The first model may also be a mathematical model created based on natural laws including physical laws and chemical laws, or a mathematical model created based on empirical rules. The first model may also be formed by combining the machine learning model and the mathematical model.

Next, the control device 30 acquires a modified value of the second condition list based on a second model that outputs the modified value of the second condition list in response to an input including the first processed product information (S5). The modified value of the second condition list includes a modified value of each control parameter included in the second condition list. When the yield of the first processed product from the first device 2 changes, that is, when the flow rate of the first processed product input to the second device 3 changes, the yield of the second processed product output from the second device 3 may also change. In order to achieve the target yield of the second processed product even when the yield of the first processed product changes, the production system 1 calculates the modified value of the second condition list to set the second condition list that corresponds to the changed yield of the first processed product. The second model may be a model that specifies the relationship between an input including the first processed product information and an output including the modified value of the second condition list. The second model may be, for example, a machine learning model created by a machine learning using the first processed product information and the modified value of the second condition list as a training data. The modified value of the second condition list may be acquired by the actual measurement or the simulation in order to create the training data. The second model may be a mathematical model created based on natural laws including physical laws and chemical laws, or a mathematical model created based on empirical rules. The second model may be formed by combining the machine learning model and the mathematical model. It is also preferable that the input of the second model includes the second device information in addition to the first processed product information.

Next, the control device 30 acquires the second condition list modified based on the second condition list and the modified value of the second condition list (S6). For example, the control device 30 may acquire the modified second condition list including each modified control parameter by adding the modified value of each control parameter included in the modified value of the second condition list to each control parameter included in the second condition list. The control device 30 stores the modified second condition list in the storage unit 30B.

Next, the control device 30 acquires an estimated first device information based on a third model that outputs the estimated first device information, which is information related to the state of the first device 2 and is not detected by the first sensor 21, in response to an input including the raw material information, the first device information, and the first processed product information (S7). The estimated first device information is information different from the information of the first device 2 detected by the first sensor 21. When the first device 2 is a reactor, the estimated first device information includes at least one of the activity of a catalyst provided inside the first device 2, the heat exchange efficiency of the first device 2, and the flow state of the raw material in the first device 2. When the first device 2 is a separator, the estimated first device information includes at least one of the heat exchange efficiency of the first device 2 and the flow state of the raw material in the first device 2.

The third model is a model that specifies the relationship between an input including raw material information, the first device information, and the first processed product information, and an output including the estimated first device information. The third model includes at least one of a machine learning model and a mathematical model. The third model may be, for example, a machine learning model created by a machine learning using the raw material information, the first device information, the first processed product information, and the estimated first device information as a training data. The first processed product information and the estimated first device information may be acquired by the actual measurement or the simulation to create the training data. The third model may also be a mathematical model created based on natural laws including physical laws and chemical laws, or a mathematical model created based on empirical rules. The third model may also be formed by combining the machine learning model and the mathematical model.

Next, the control device 30 acquires the modified value of the first condition list based on a fourth model that outputs the modified value of the first condition list in response to an input including at least one of the estimated first device information and the first processed product information (S8). The modified value of the first condition list includes the modified value of each control parameter included in the first condition list. The fourth model is a model that specifies the relationship between the input including the estimated first device information and the first processed product information and the output including the modified value of the first condition list. The fourth model may be, for example, a machine learning model created by a machine learning using the estimated first device information, the first processed product information, and the modified value of the first condition list as a training data. The modified value of the first condition list may be acquired by the actual measurement or the simulation to create the training data. The fourth model may also be a mathematical model created based on natural laws including physical laws and chemical laws, or a mathematical model created based on empirical rules. The fourth model may also be formed by combining the machine learning model and the mathematical model. Moreover, it is preferable that the input of the fourth model includes the first device information in addition to the estimated first device information and the first processed product information.

Next, the control device 30 acquires the first condition list modified based on the first condition list and the modified value of the first condition list (S9). For example, the control device 30 may acquire the modified first condition list including each modified control parameter by adding the modified value of each control parameter included in the modified value of the first condition list to each control parameter included in the first condition list. The control device 30 stores the modified first condition list in the storage unit 30B.

After acquiring the modified first condition list, the control device 30 ends the processing of modifying the condition list. The control device 30 performs the processing of modifying the condition list to acquire the modified first condition list and the modified second condition list. The control device 30 then controls the first device 2 and the second device 3 based on the modified first condition list and the modified second condition list. For example, the control device 30 controls the first to third flow control valves 11A to 11C, the first temperature regulator 18, and the second temperature regulator 19 based on the modified first condition list and the modified second condition list. In addition, when the first device 2 and the second device 3 are centrifuges, the control device 30 may control the rotation number and the processing time of the first device 2 and the second device 3.

When the first process is a chemical reaction, the raw material information may include at least one of the composition of the raw material, the density of the raw material, and the molecular weight of the raw material. The first device information may include at least one of the inlet temperature of the first device 2, the outlet temperature of the first device 2, the internal temperature of the first device 2, the internal pressure of the first device 2, and the flow rate of the raw material in the first device 2. The first processed product information may include at least the yield of the first processed product. The estimated first device information may include at least one of the activity of the catalyst provided inside the first device 2, the heat exchange efficiency of the first device 2, and the flow state of the raw material in the first device 2. The first condition list may include at least one of the internal temperature of the first device 2, the internal pressure of the first device 2, and the flow rate of the raw material in the first device 2. The second condition list may include at least one of the internal temperature of the second device 3, the internal pressure of the second device 3, and the flow rate of the first processed product in the second device 3.

When the first process is a separation, the raw material information may include at least one of the composition of the raw material, the density of the raw material, and the molecular weight of the raw material. The first device information may include at least one of the inlet temperature of the first device 2, the outlet temperature of the first device 2, the internal temperature of the first device 2, the internal pressure of the first device 2, and the flow rate of the raw material in the first device 2. The first processed product information may include at least the yield of the first processed product. The estimated first device information may include at least one of the heat exchange efficiency of the first device 2 and the flow state of the raw material in the first device 2. The first condition list may include at least one of the internal temperature of the first device 2, the internal pressure of the first device 2, and the flow rate of the raw material in the first device 2. The second condition list may include at least one of the internal temperature of the second device 3, the internal pressure of the second device 3, and the flow rate of the first processed product in the second device 3.

When the first process is an extraction, the raw material information may include at least one of the composition of the raw material, the density of the raw material, and the molecular weight of the raw material. The first device information may include at least one of the inlet temperature of the first device 2, the outlet temperature of the first device 2, the internal temperature of the first device 2, the internal pressure of the first device 2, and the flow rate of the raw material in the first device 2. The first processed product information may include at least the yield of the first processed product. The estimated first device information may include at least one of the heat exchange efficiency of the first device 2 and the flow state of the raw material in the first device 2. The first condition list may include at least one of the internal temperature of the first device 2, the internal pressure of the first device 2, and the flow rate of the raw material in the first device 2. The second condition list may include at least one of the internal temperature of the second device 3, the internal pressure of the second device 3, and the flow rate of the first processed product in the second device 3.

When the first process is a crystallization, the raw material information may include at least one of the composition of the raw material, the density of the raw material, the molecular weight of the raw material, and the size of the seed crystals contained in the raw material. The first device information may include at least one of the inlet temperature of the first device 2, the outlet temperature of the first device 2, the internal temperature of the first device 2, the internal pressure of the first device 2, and the flow rate of the raw material in the first device 2. The first processed product information may include at least one of the yield of the first processed product, the crystal size of the first processed product, and the crystal form of the first processed product. The estimated first device information may include at least one of the heat exchange efficiency of the first device 2 and the flow state of the raw material in the first device 2. The first condition list may include at least one of the internal temperature of the first device 2, and the flow rate of the raw material in the first device 2. The second condition list may include at least one of the internal temperature of the second device 3, the internal pressure of the second device 3, and the flow rate of the first processed product in the second device 3.

When the first process is a distillation, the raw material information may include at least one of the composition of the raw material, the density of the raw material, and the molecular weight of the raw material. The first device information may include at least one of the internal temperature of the first device 2, the internal pressure of the first device 2, and the flow rate of the raw material in the first device 2. The first processed product information may include at least one of the yield of the first processed product, the density of the first processed product, and the specific heat of the first processed product. The estimated first device information may include at least one of the heat exchange efficiency of the first device 2 and the flow state of the raw material in the first device 2. The first condition list may include at least one of the internal temperature of the first device 2, the internal pressure of the first device 2, and the flow rate of the raw material in the first device 2. The second condition list may include at least one of the internal temperature of the second device 3, the internal pressure of the second device 3, and the flow rate of the first processed product in the second device 3.

When the first process is a centrifugation, the raw material information may include at least one of the composition of the raw material, the density of the raw material, and the molecular weight of the raw material. The first device information may include at least one of the internal temperature of the first device 2, the internal pressure of the first device 2, and the rotation number of the first device 2. The first processed product information may include at least the yield of the first processed product. The first condition list may include at least one of the internal temperature of the first device 2, the internal pressure of the first device 2, the rotation number of the first device 2, and the number of processing times. The second condition list may include at least one of the internal temperature of the second device 3, the internal pressure of the second device 3, and the flow rate of the first processed product in the second device 3.

When the first process is a drying, the raw material information may include at least one of the composition of the raw material, the density of the raw material, and the molecular weight of the raw material. The first device information may include at least one of the internal temperature of the first device 2, the internal pressure of the first device 2, and the heating rate of the first device 2. The first processed product information may include at least the property of the first processed product (water saturation degree, moisture content, density, etc.). The first condition list may include at least one of the internal temperature of the first device 2, the internal pressure of the first device 2, and the heating rate of the first device 2. The second condition list may include at least one of the internal temperature of the second device 3, the internal pressure of the second device 3, the flow rate of the first processed product in the second device 3, and the heating rate of the first device 2.

According to the production system 1 of the embodiment, the property of the first processed product supplied to the second process is estimated, and the second condition list is modified based on the property of the first processed product. This makes it possible to control the state of the second processed product. That is, in the production system 1 including a plurality of continuous processes, the state of the final product can be controlled. In addition, the first condition list is modified based on the estimated first device information. This makes it possible to control the state of the first processed product supplied to the second process. As described above, even when the capacity of the first device 2 is reduced, the state of the second processed product, such as the yield and the quality, can be controlled.

According to the production system 1, it is possible to reliably and simply operate continuous processes that combines existing processes where the condition list of the parameter is defined. Furthermore, according to the production system 1, it is possible to insert a new process into continuous processes that includes a plurality of processes. Furthermore, it is possible to reliably and simply operate continuous processes where the new process was inserted.

Although the description of the specific embodiment is finished above, the present invention is not limited to the above embodiment and can be modified widely. For example, in the process of modifying the condition list shown in FIG. 2, steps S7 to S9 may be omitted. That is, the modifying of the first condition list may be omitted. In addition, in the process of modifying the condition list shown in FIG. 2, steps S5 to S6 may be omitted. That is, the second condition list may not be modified, and only the first condition list may be modified. In addition, in the above embodiment, the second model is described as acquiring the modified value of the second condition list, but the second model may also be configured to output an operation instruction to the second device 3. For example, when the yield of the first processed product, which is the first processed product information output by the first model, exceeds the allowable range, the second model may output an operation instruction to stop the second device 3.

Figure 3:
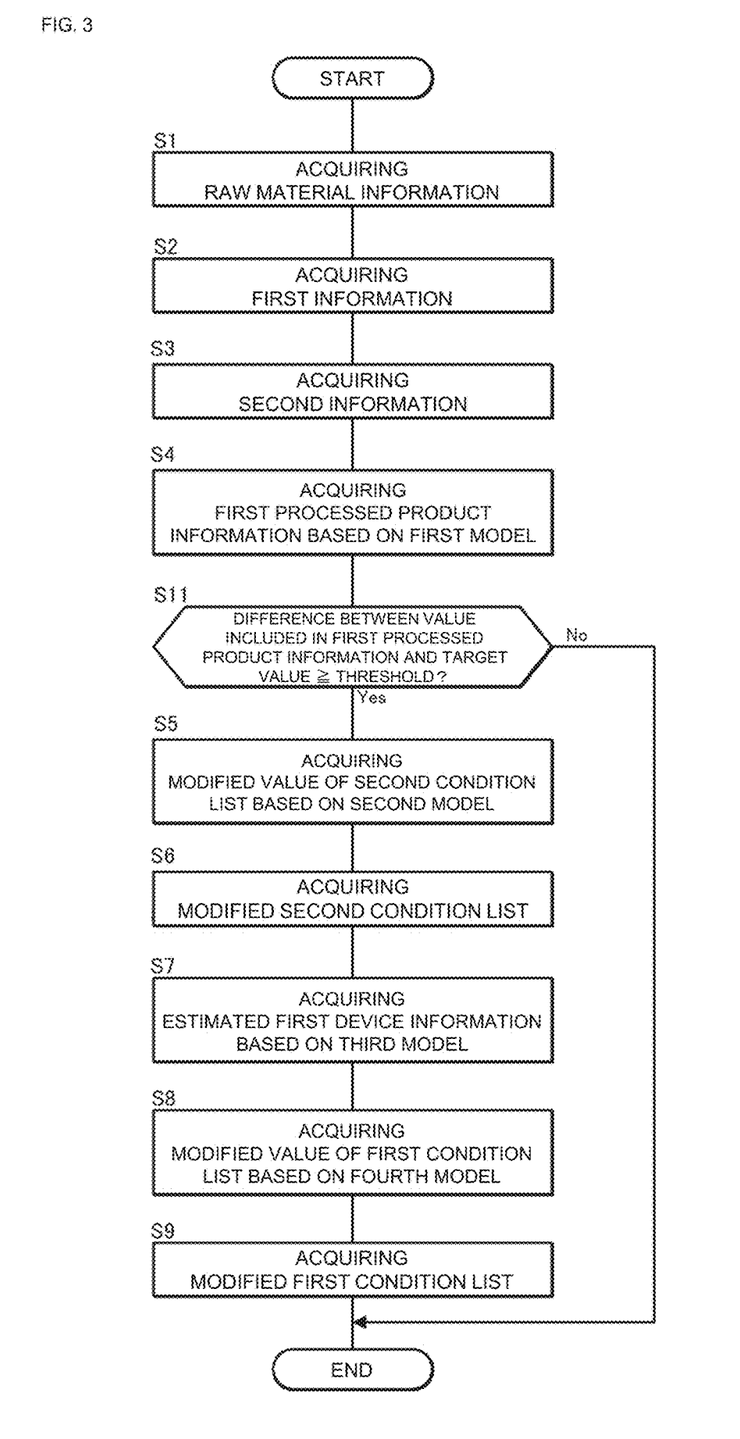
FIG. 3 is a diagram showing a flow of a condition list modification processing for the modified example.

In addition, in the process of modifying the condition list, the control device 30 may acquire a modified value of the second condition list based on the first processed product information and the second model when the difference between the value included in the first processed product information and the target value is equal to or greater than a threshold. Specifically, as shown in FIG. 3, in the process of modifying the condition list, between step S4 and step S5, step S11 may be provided to determine whether the difference between the value included in the first processed product information and the target value is equal to or greater than a threshold. Then, when the difference between the value included in the first processed product information and the target value is equal to or greater than the threshold (the determination result of step S11 is Yes), step S5 may be performed. When the difference between the value included in the first processed product information and the target value is less than the threshold (the determination result of step S11 is No), the control device 30 may omit steps S5 to S9 and end the process of modifying the condition list. According to this aspect, when the difference between the value included in the first processed product information and the target value is equal to or greater than the threshold, the first condition list and the second condition list are modified.

The storage unit 30B of the control device 30 may be configured to store the modified first condition list and the modified second condition list over time, and the first model, the second model, the third model, and the fourth model may be configured to be appropriately modified based on the modified first condition list and the modified second condition list stored in the storage unit 30B. For example, when the control is performed using the modified first condition list and the modified second condition list, but the target yield of the second processed product (final product) is no longer obtained, it is possible that the setting of any of the first model, the second model, the third model, or the fourth model is inappropriate. In this case, by referring to the first condition list and the second condition list stored over time in the storage unit 30B, it is possible to identify which of the first to fourth models has a defect by checking the condition list at the time when the target yield of the second processed product is no longer obtained. The model where the defect was identified can be modified by re-learning or by resetting parameters by an operator.

In the above embodiment, the first process and the second process are described, but the number of processes is not limited to two, and may include more processes. For example, the production system 1 may include three processes, the first process, the second process, and the third process, and may be configured to modify the second condition list of the second device 3 that performs the second process or the third condition list of the third device 50 that performs the third process based on the yield of the first processed product output from the first device 2 that performs the first process, or may be configured to modify the third condition list based on the yield of the second processed product output from the second device 3. In other words, the first process and the second process described in the above embodiment are two continuous processes, and any number of processes may be provided upstream of the first process, and any number of processes may be provided downstream of the second process.

Figure 4:
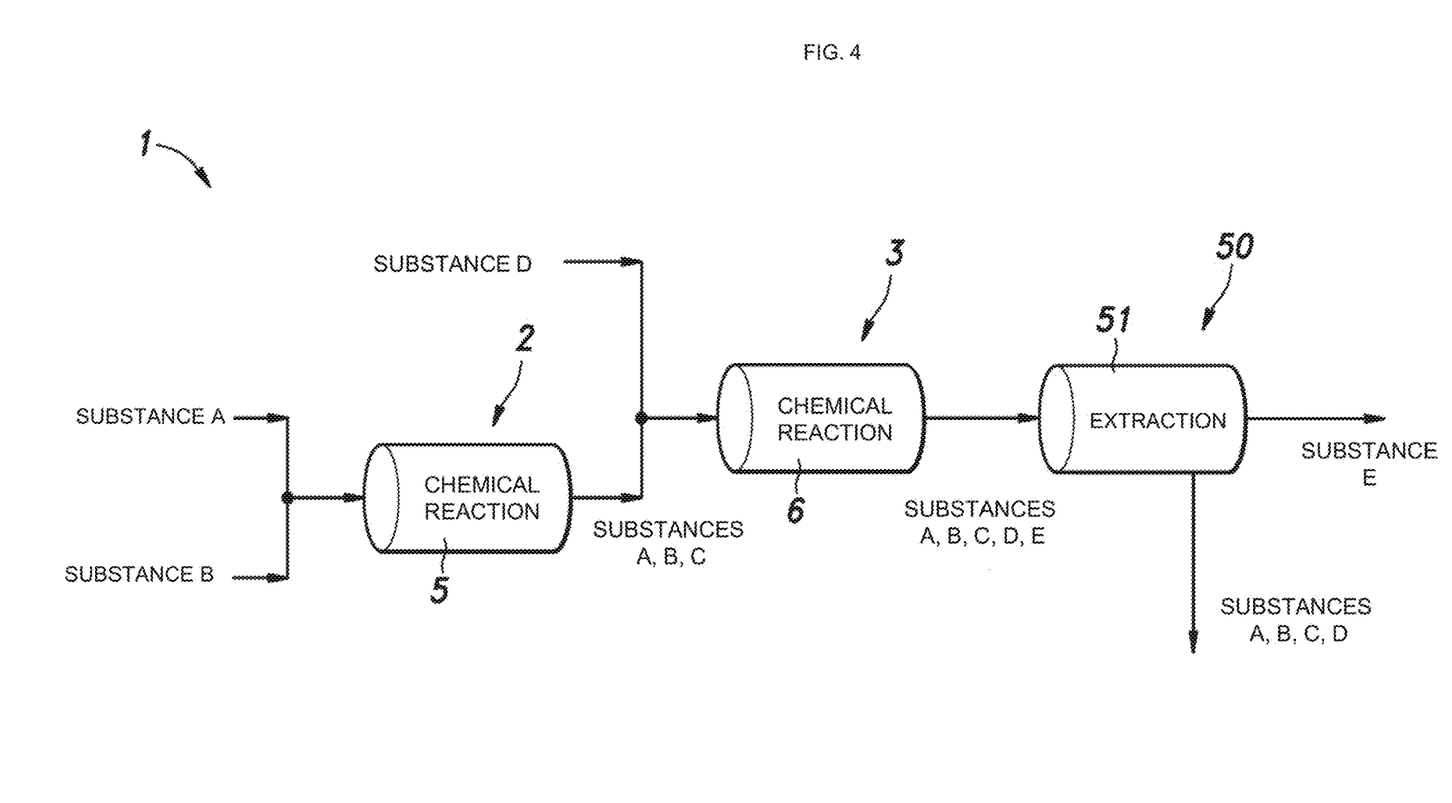
FIG. 4 is a diagram showing a configuration of a production system.

FIG. 4 shows an example of the production system 1. In FIG. 4, each sensor, the flow control valve, and the control device are omitted, and only the main parts of the production system 1 are shown. As shown in FIG. 4, the production system 1 performs the first process, the second process, and the third process in order. The first process chemically reacts substances A and B under a catalyst N to produce substance C. The first processed product supplied from the first process to the second process includes substances A and B, and substance C. The second process chemically reacts substance C in the first processed product with newly added substance D to produce substance E. The second processed product supplied from the second process to the third process includes unreacted substances A, B, C, and D, and substance E. The third process extracts substance E from the second processed product including substances A to E supplied from the second process as the third processed product. The first process is performed by the first device 2 which is a reactor, the second process is performed by the second device 3 which is a reactor, and the third process is performed by the third device 50 which is an extraction device.

The first condition list, which includes a plurality of control parameters of the first device 2, has the following set: 10 L/h as the target flow rate of substance A, 15 L/h as the target flow rate of substance B, 300° C. as the target internal temperature of the first device body 5, 120 kPa as the target internal pressure of the first device body 5, 80% as the target yield of substance C, and 20 L/h as the target flow rate of substance C.

The second condition list, which includes a plurality of control parameters of the second device 3, has the following set: 5 L/h as the total target flow rate of substances A and B, 20 L/h as the target flow rate of substance C, 20 L/h as the target flow rate of substance D, 250° C. as the target internal temperature of the second device body 6, 80 kPa as the target internal pressure of the second device body 6, 75% as the target yield of substance E, and 33.75 L/h as the target flow rate of substance E.

The third condition list, which includes a plurality of control parameters of the third device 50, has the following set: 11.25 L/h as the target total flow rate of substances A, B, C, and D, 33.75 L/h as the target flow rate of substance E, 200° C. as the target internal temperature of the third device body 51, 100 kPa as the target internal pressure of the third device body 51, and 67% as the target yield of substance E.

The first condition list, the second condition list, and the third condition list are set so that the flow rates of each substance in each process are consistent with each other. For example, the target flow rate of substance C produced in the first process is consistent with the target flow rate of substance C supplied to the second process. Furthermore, the first condition list, the second condition list, and the third condition list are set so that the temperatures of each reaction device in each process are consistent with each other.

During operation of the continuous processes combining the first to third processes, the control device 30 acquires the yield of the substance C produced by the first process based on the first model, and monitors whether the acquired yield of the substance C matches the target yield of the substance C set in the first condition list. Similarly, the control device 30 acquires the yield of the substance E produced by the second process based on the first-2 model, and monitors whether the acquired yield of the substance E matches the target yield of the substance E set in the second condition list. Similarly, the control device 30 acquires the yield of the substance E produced by the third process based on the first-3 model, and monitors whether the acquired yield of the substance E matches the target yield of the substance E set in the third condition list. The first-2 model and the first-3 model may be created in the same manner as the first model. In other words, the first-2 model is a model that specifies the relationship between an input including information of each substance supplied to the second device 3 and second device information, and an output including second processed product information (substance E). The first-3 model is a model that defines the relationship between an input including information of each substance supplied to the third device 50 and third device information, and an output including second processed product information (substance E).

For example, the allowable yield of substance C by the first process may be set in the range of 78% to 82% (threshold of error 2%). In this case, when the yield of substance C estimated by the first model falls outside the allowable range, the downstream second process may not operate normally, and substance E may not be produced or the required yield may not be obtained. To avoid this, the second model inputs the yield of substance C produced by the first process estimated by the first model (78%) and the parameters of the current condition list of the second process, and outputs the modified value of the parameter of the second condition list. For example, based on the second model, the control device 30 outputs the modified value such as increasing the temperature in the reactor by 10° C. or decreasing the flow rate of substance D by 1 L/h as the modified value of the parameters of the second condition list. As a result, the control device 30 acquires the modified second condition list. As described above, according to the present invention, when the yield of substance C produced by the first process changes from the target value, the condition list of the downstream second process can be modified in real time to correspond to the change. This allows continuous processes to operate without stopping.

The production system 1 further includes the second-2 model that inputs the yield of substance E produced from the second process, estimated by the first-2 model and the parameter of the current condition list of the third process, and outputs the modified value of the parameter of the third condition list.

The production system 1 also includes a third model, a third-2 model, and a third-3 model that output the estimated device information for each process. The third model inputs the current device information of the first process (current internal temperature, internal pressure, etc. of the device of the first process), the raw material information (first device information such as the current flow rate of substance A and the current flow rate of substance B), and the first processed product information (flow rate of substance C) and outputs the estimated first device information (catalytic activity, heat exchange efficiency, etc. of the first device 2). The third-2 model inputs the current device information of the second process (second device information such as the current internal temperature, internal pressure, etc. of the device of the second process), the raw material information (current flow rate of substance C, current flow rate of substance D), and the second processed product information (flow rate of substance E) and outputs the estimated second device information (catalytic activity, heat exchange efficiency, etc. of the second device 6). The third-3 model inputs current device information of the third process (third device information such as the current internal temperature and internal pressure of the device of the third process), the raw material information (current flow rates of substances A+B+C+D, current flow rate of substance E), and the third processed product information (yield of substance E), and outputs the estimated third device information (heat exchange efficiency, etc. of the third device 51).

Furthermore, the production system 1 includes a fourth model that modifies the first condition list based on the first processed product information output by the first model and/or the estimated first device information output by the third model, a fourth-2 model that modifies the second condition list based on the second processed product information output by the first-2 model and/or the estimated second device information output by the third-2 model, and a fourth-3 model that modifies the third condition list based on the third processed product information output by the first-3 model and/or the estimated third device information output by the third-3 model.

For example, the allowable yield of substance C by the first process may be set in the range of 78% to 82% (threshold of error 2%). In this case, when the yield of substance C estimated by the first model is outside the allowable range, a process of modifying the first condition list using the third model and the fourth model is performed to bring the yield of substance C within the allowable range. For example, based on the fourth model, the control device 30 outputs the modified value of the parameter of the first condition list, such as increasing the target internal temperature of the first device body 5 by 10° C. or increasing the flow rate of substance B by 1 L/h. As a result, the control device 30 acquires the modified first condition list.

As described above, according to the present invention, when operating continuous processes that combines a plurality of processes where the condition list of operating parameter was formulated in advance, the condition list can be modified in real time in response to changes in the actual operating state of each process. This makes it possible to optimize the operation of the entire process without stopping the continuous processes.

REFERENCE SIGNS LIST

1: production system, 2: first device, 3: second device, 5: first device body, 6: second device body, 8: raw material supply pipe, 8A: first raw material supply pipe, 8B: second raw material supply pipe, 8C: third raw material supply pipe, 11A: first flow control valve, 11B: second flow control valve, 11C: third flow control valve, 13: connecting pipe, 15: outlet pipe, 18: first temperature regulator, 19: second temperature regulator, 21: first sensor, 23: second sensor, 30: control device, 30B: storage unit, 32: input device, 50: third device, 51: third device main body

The invention claimed is:

1. A production system that performs a first process and a second process continuously, comprising:
a first device;
a second device;
at least one first sensor; and
a processor, wherein
the first device obtains a first processed product from a raw material by performing the first process, which is any one of a chemical reaction, a separation, and a drying,
the second device obtains a second processed product from the first processed product by performing the second process, which is any one of a chemical reaction, a separation, and a drying,
the first sensor detects a first device information that is a state of the first device,
the processor controls the first device based on a preset first condition list including a plurality of control parameters of the first device, and modifies a preset second condition list including a plurality of control parameters of the second device, and controls the second device based on the modified second condition list,
the first device information includes a flow rate of the raw material and at least one of an inlet temperature of the first device, an outlet temperature of the first device, an internal temperature of the first device, an internal pressure of the first device, and a flow rate of the raw material in the first device,
the preset first condition list includes at least one of a target internal temperature of the first device, a target internal pressure of the first device, and a target flow rate of the raw material in the first device,
the preset second condition list includes at least one of a target internal temperature of the second device, and a target internal pressure of the second device,
the processor acquires a yield of a first processed product based on a first model that outputs the yield of the first processed product in response to an input including a raw material information related to a property of the raw material and the first device information,
the processor acquires a modified value of the preset second condition list based on a second model that outputs a modified value of the preset second condition list in response to an input including the yield of the first processed product,
the processor acquires a modified second condition list based on the preset second condition list and the modified value of the preset second condition list,
the processor acquires an estimated first device information based on a third model that outputs the estimated first device information, which is information related to a state of the first device and is not detected by the first sensor, in response to an input including the raw material information, the first device information, and the yield of the first processed product,
the processor acquires a modified value of the preset first condition list based on a fourth model that outputs a modified value of the preset first condition list in response to an input including at least one of the estimated first device information and the yield of the first processed product,
the processor acquires a modified first condition list based on the preset first condition list and the modified value of the preset first condition list,
the processor controls the first device based on the modified first condition list instead of the preset first condition list, and
the first model and the second model include at least one of a machine learning model and a mathematical model.

2. The production system of claim 1, wherein
the production system further comprises at least one second sensor,
the second sensor detects a second device information that is a state of the second device,
the second device information includes at least one of an inlet temperature of the second device, an outlet temperature of the second device, an internal temperature of the second device, and an internal pressure of the second device, and
the input to the second model further includes the second device information.

3. The production system of claim 1, wherein
the first process is a chemical reaction,
the raw material information includes at least one of a composition of the raw material, a density of the raw material, and a molecular weight of the raw material, and
the estimated first device information includes at least one of an activity of a catalyst provided inside the first device, a heat exchange efficiency of the first device and a flow state of the raw material in the first device.

4. The production system of claim 1, wherein
the first process is separation,
the raw material information includes at least one of a composition of the raw material, a density of the raw material, and a molecular weight of the raw material,
the estimated first device information includes at least one of a heat exchange efficiency of the first device and a flow state of the raw material in the first device, and
the preset first condition list includes at least one of an internal temperature of the first device, an internal pressure of the first device, and a flow rate of the raw material in the first device.

5. The production system of claim 1, wherein
the first process is drying,
the raw material information includes at least one of a composition of the raw material, a density of the raw material, and a molecular weight of the raw material, and
the preset first condition list includes at least one of an internal temperature of the first device, an internal pressure of the first device, and a heating rate of the first device.

6. The production system of claim 1, wherein
the first process is a batch process.

7. The production system of claim 1, wherein
the first model is a machine learning model created by a machine learning using the raw material information, the first device information, and the yield of the first processed product as a training data.

8. The production system of claim 1, wherein
the second model is a machine learning model created by a machine learning using the yield of the first processed product and the modified value of the second condition list as a training data.

9. The production system of claim 1, wherein
The processor acquires a modified value of the preset second condition list based on the yield of the first processed product and the second model when a difference between a value included in the yield of the first processed product and a target value is equal to or greater than a threshold value.

10. The production system of claim 3, wherein
the processor includes a storage unit that stores the modified first condition list and the modified second condition list.

* * * * *